Patented May 12, 1942

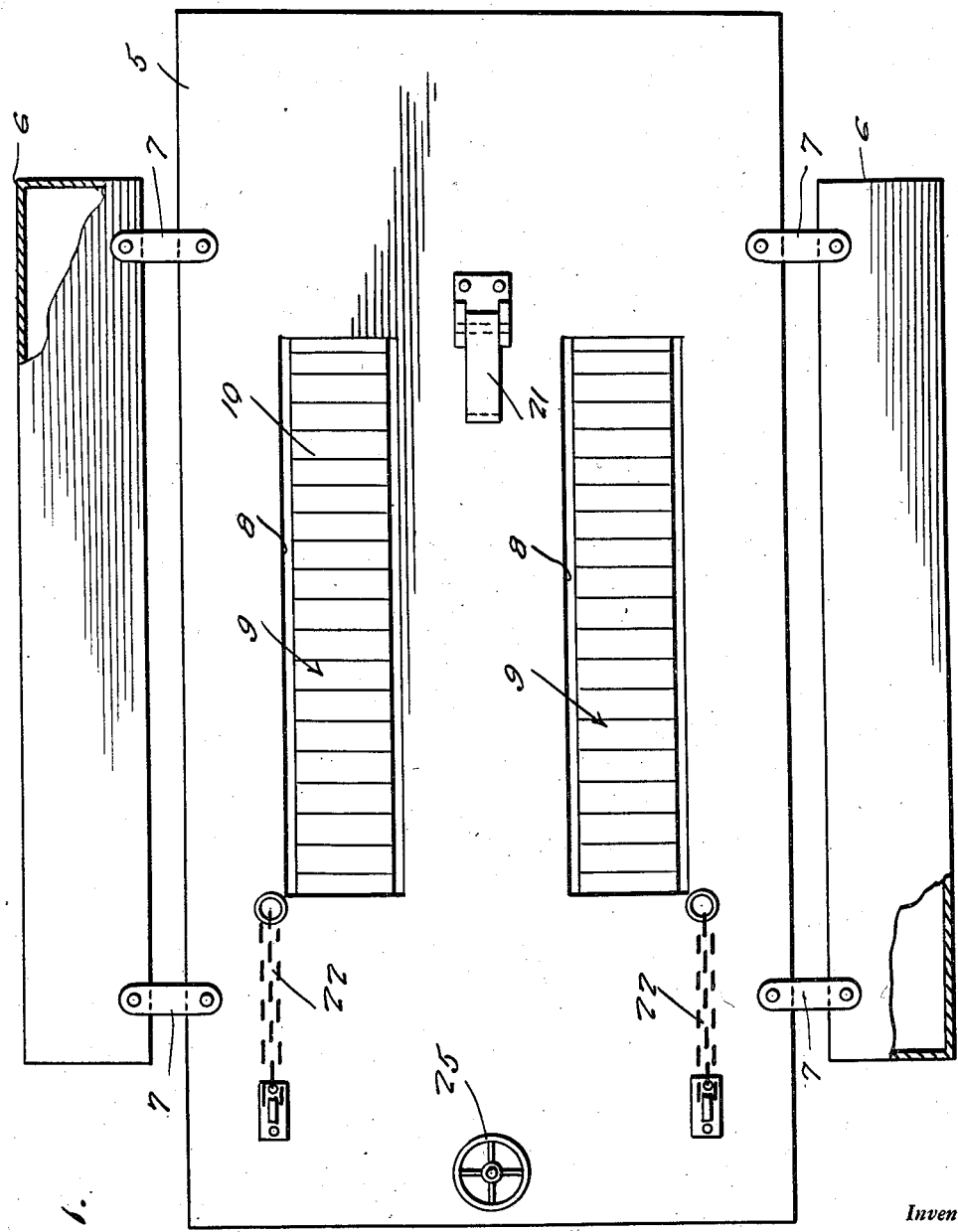

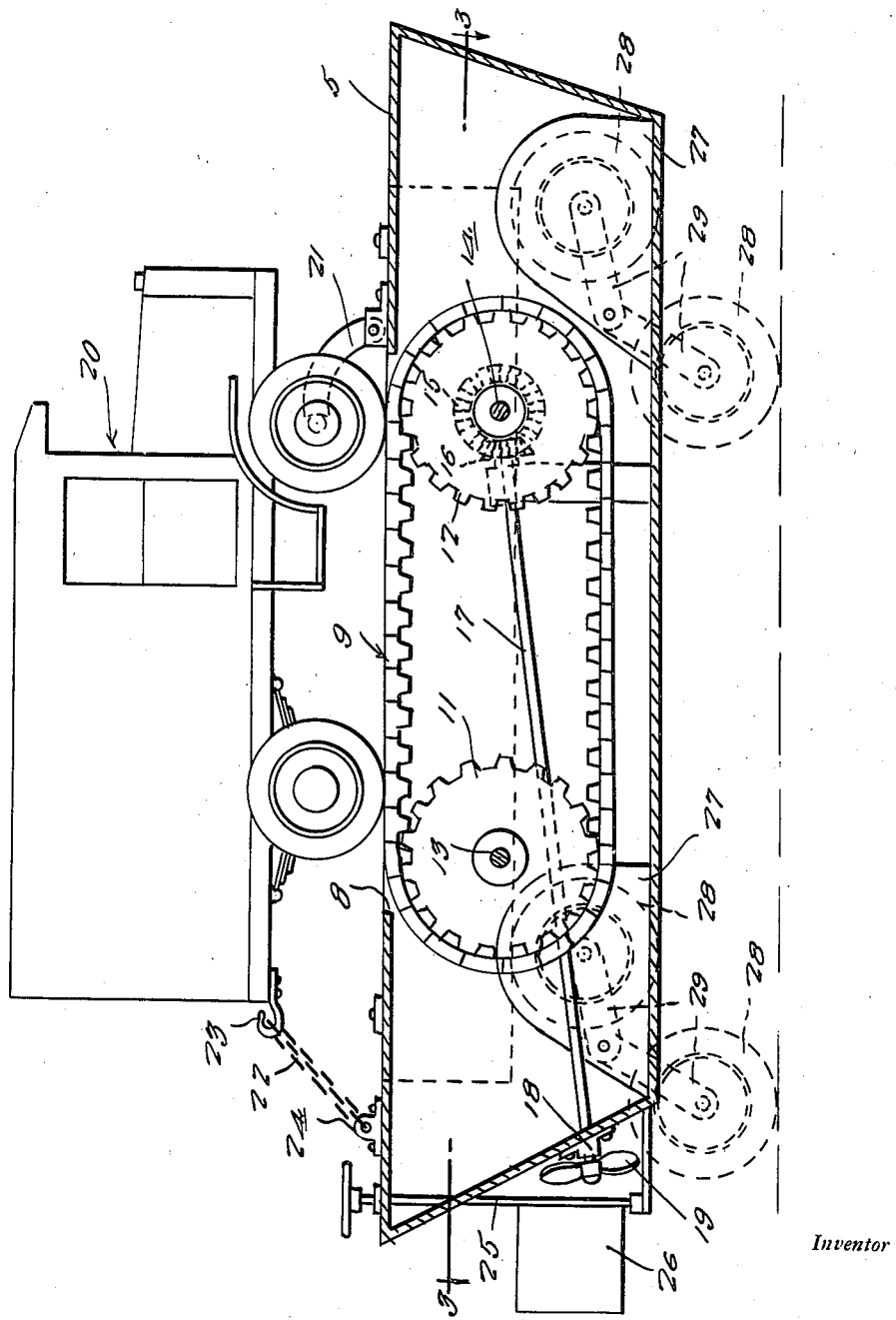

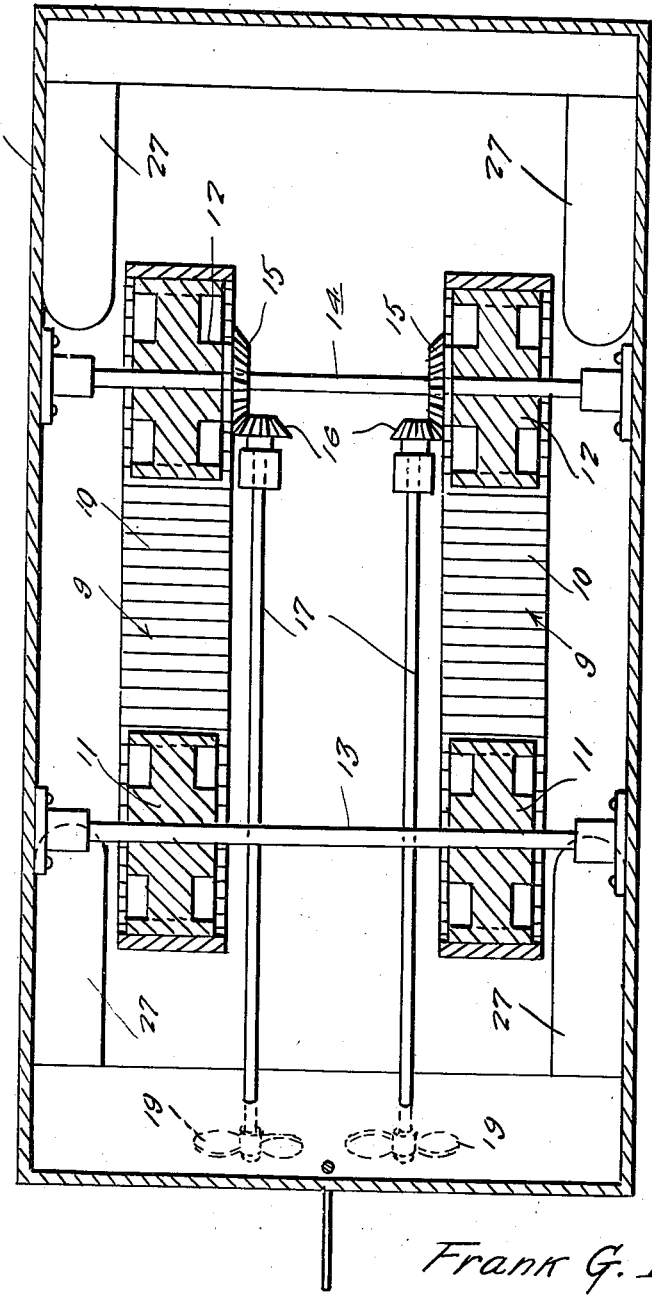

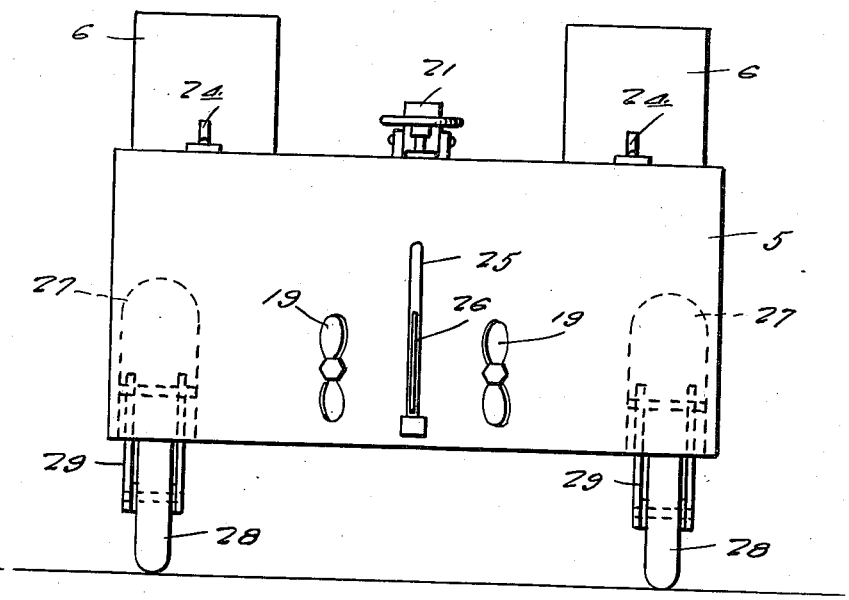
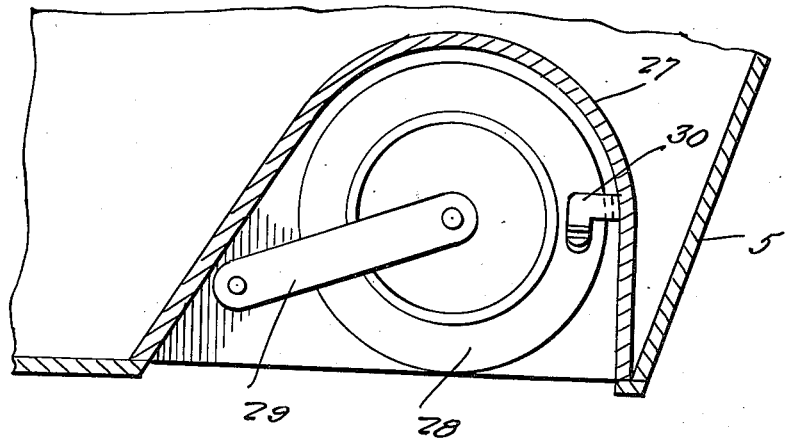

2,282,745

UNITED STATES PATENT OFFICE 2,282,745

VEHICLE DRIVEN BOAT

Frank G. Preston, Tacoma, Wash.

Application May 2, 1941, Serial No. 391,590

5 Claims. (Cl. 115—0.5)

This invention relates to new and useful improvements in marine vessels and more particularly to a marine vessel especially adapted for transporting army tanks and other motorized equipment across navigable streams.

The principal object of the present invention is to provide a marine vessel having propulsion means adapted to be driven by the land vehicle transported.

Another important object of the invention is to provide a marine vessel for transporting army tanks and other motorized equipment which is equipped with wheels and can be used in the capacity of a trailer in between bodies of water to be crossed by a train of motorized equipment.

Other objects and advantages of the invention will become apparent to the reader of the following specification.

In the drawings:

Figure 1 represents a top plan view of the marine vessel with portions of the lateral pontoons broken away.

Figure 2 is a longitudinal sectional view through the marine vessel.

Figure 3 is a horizontal sectional view taken substantially on the line 3—3 of Figure 2.

Figure 4 is a rear elevational view of the marine vessel with the lateral pontoons placed on top of the vessel, and the wheels lowered to transform the vessel into a trailer.

Figure 5 is a fragmentary detailed sectional view showing one of the wheels in retracted position.

Referring to the drawings wherein like numerals designate like parts, it can be seen that numeral 5 denotes the main pontoon or barge, while numerals 6, 6 denote lateral pontoons which are disposed laterally of the main pontoon 5 and held in place by suitable connectors 7.

The floor of the pontoon 5 is formed with a pair of elongated rectangular-shaped openings 8, 8 in which the upper portions of treadmills 9, 9 operate. These treadmills each consists of an endless power transmitting element 10 trained over sprocket wheels 11, 12 on shafts 13, 14 located below the floor of the pontoon 5. On the shaft 14 is a beveled gear 15 meshing with a bevel pinion 16 carried by the forward end of a drive shaft 17 which extends rearwardly and through a packing box 18. The outer end of each of these shafts 17 is equipped with a propeller 19.

Figure 2 shows an army truck 20 parked on the treadmill 9 and held in place by a pivotal chuck arm 21 engaging the front axle of the truck while a chain 22 extends from a hook 23 on the rear of the truck 20 to an anchoring member 24 on the rear portion of the pontoon floor. Obviously as the wheels of the truck 20 turn, the treadmills 9 are set in motion, transmitting power to the shaft 14 and to the shaft 17 and ultimately to the propellers 19 for propelling the marine vessel.

In order to steer the vessel, the shaft 25 is disposed downwardly through the stern portion of the pontoon and is equipped with a rudder 26.

Pocket structures 27 are provided in the bottom corner portions of the pontoon 5 for the purpose of receiving wheels 28 when they are in retracted position. Each of these wheels 28 is mounted on an arm 29 and as shown in Figure 2, the wheels can be swung downwardly so that the arms bear backwardly against the rear portions of the pockets. As a matter of fact, suitable detent means 30 is provided in each of the pockets 27 for retaining the corresponding wheel 28 in retracted position. Before the pontoon 5 reaches the shore while in shallow water, the wheels 28 can be dropped and when pulled onto land the wheels cannot return to the pockets 27 if moved in a direction toward the right as the structure shown in Figure 2.

Each marine vessel may be used a number of times for transporting motorized equipment across a stream. When loaded with a piece of motorized equipment, the vessel is propelled by the transported vehicle. To return the vessel, it may simply have a pull cable or rope attached to its rear end and be pulled back by a truck equipped with power driven drum and line.

Obviously, when the vessel is being used on land as a trailer, the pontoons 6 can be arranged on the top of the floor of the main pontoon 5 in parallel spaced relation to serve as benches, as shown in Figure 4, upon which troops can sit.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A vessel of the character described comprising a pontoon, a treadmill having an upper flight thereof operative on a plane with the top of the pontoon and forming a part of the deck of the pontoon, said treadmill being driven by an operating vehicle held upon the pontoon, a shaft extending through the rear of the pontoon and being driven by the treadmill and a propeller at the rear end of the shaft.

2. A vessel of the character described comprising a pontoon, a treadmill having an upper flight thereof operative on a plane with the top of the pontoon and forming a part of the deck of the pontoon, said treadmill being driven by an operating vehicle held upon the pontoon, a shaft extending through the rear of the pontoon and being driven by the treadmill and a propeller at the rear end of the shaft, and retractible wheels for the pontoon.

3. A vessel of the character described comprising a pontoon, a treadmill having an upper flight thereof operative on a plane with the top of the pontoon and forming a part of the deck of the pontoon, said treadmill being driven by an operating vehicle held upon the pontoon, a shaft extending through the rear of the pontoon and being driven by the treadmill and a propeller at the rear end of the shaft, and outrigger pontoons for the said first-mentioned pontoon.

4. A vessel of the character described comprising a pontoon, a treadmill having an upper portion thereof operative through the top of the pontoon and adapted to be driven by an operating vehicle held upon the pontoon, a shaft extending through the rear of the pontoon and being driven by the treadmill and a propeller at the rear end of the shaft, and outrigger pontoons for the said first-mentioned pontoon, said outrigger pontoons being removable and adapted for placement upon the first-mentioned pontoon to define parallel benches.

5. A vessel of the character described comprising a pontoon, a treadmill having an upper flight thereof operative on a plane with the top of the pontoon and forming a part of the deck of the pontoon, said treadmill being driven by an operating vehicle held upon the pontoon, a shaft extending through the rear of the pontoon and being driven by the treadmill and a propeller at the rear end of the shaft, and anchoring means for a vehicle on the pontoon.

FRANK G. PRESTON.